UNITED STATES PATENT OFFICE.

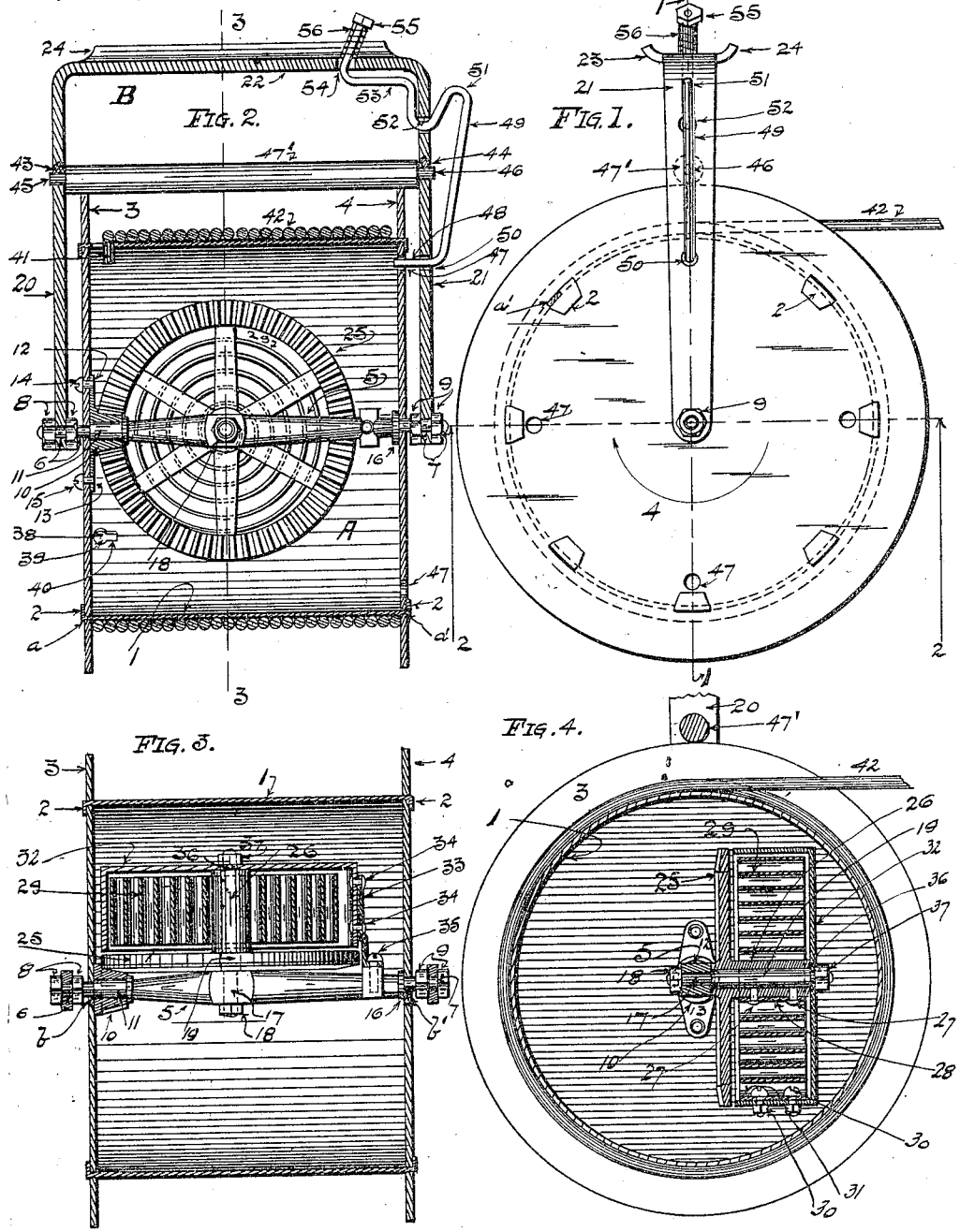

ROBERT ULBRECHT, OF CHICAGO, ILLINOIS.

CLOTHES-LINE REEL.

1,046,684.  Specification of Letters Patent.  Patented Dec. 10, 1912.

Application filed May 6, 1912. Serial No. 695,420.

*To all whom it may concern:*

Be it known that I, ROBERT ULBRECHT, a citizen of the United States, and resident of Chicago, in the county of Cook and State of Illinois, have invented certain new and useful Improvements in Clothes-Line Reels; and I do hereby declare that the following description of my said invention, taken in connection with the accompanying sheet of drawings, forms a full, clear, and exact specification, which will enable others skilled in the art to which it appertains to make and use the same.

My invention has general reference to improvements in automatic retrieving clothes-line reels, and it consists, essentially, in the novel and peculiar combination of parts and details of construction as fully set forth and described, and then pointed out in the claims.

Referring to the drawings already mentioned, Figure 1 is a side view of my newly invented device; Fig. 2, a vertical sectional elevation thereof, taken in line 1 1 of Fig. 1; Fig. 3, a horizontal sectional plan, in line 2 2 of Fig. 1, and Fig. 4, a transverse sectional view, in line 3 3 of Fig. 2.

Like parts are designated by corresponding symbols or characters of reference in all the figures of the drawing.

The object of this invention is the production of a simple, cheap, and efficient self retrieving reel for clothes-lines and the like; my aim, to provide a device easily within the reach of the majority of housewives, an article which will not get out of order, and one that will combine a maximum of reeling capacity with a minimum of weight. In its most popular size, my invention has a capacity of one hundred and seventy five feet of average clothesline, and its total weight, line included, is only a matter of six pounds.

In the drawing, A represents the reeling drum, which consists of a light metallic shell 1 of cylindrical form, having flat, circular heads 3 4 affixed thereto. Said heads may be fastened in place in any of several ways, but I prefer to do so by piercing them with a series of rectangular holes $a$ $a'$, arranged in a circle concentric with the axis of the drum, for the reception of projections 2 2, extending from the edges of shell 1. These projections, after being passed through the holes $a$ $a'$, are bent over in a plane parallel to the face of the heads and closely thereto, thereby holding the heads and shell closely together in a simple and effective manner.

Heads 3 4 are provided with central, circular apertures $b$ $b'$, for reception of round, shouldered, extremities 6 7 of an axial supporting bar 5. Within the drum A, and affixed to head 3 by means of ears 12 13 and screws 14 15, is a bevel pinion 10, adapted to loosely revolve upon an enlarged, shouldered, portion 11 of the supporting bar 5. This bar is supplied with an integral collar 16, adjacent to the interior wall of the head 4, to prevent end motion of the said drum on bar 5. At a point somewhat less than medially of its length, said bar is transversely apertured for a shouldered end 17 of a stud 19, which stud is held rigid by said shoulder and a threaded nut 18, in its proper position.

Shouldered extremities 7 6 of the bar 5 fit suitable apertures in depending legs 20 21 of a carrying handle B, there being threaded nuts 8 9 on said extremities, between which said legs are clamped, to prevent revolution of said axial supporting bar. Before mentioned legs 20 21 are formed integral with a horizontal connecting member 22, by which my device is carried and manipulated, which member is provided with rounded or flaring sides 23 24 to prevent laceration or abrasion of the hands.

Upon stud 19, meshing with bevel pinion 10, is located a bevel gear 25 having an integral cylindrical sleeve 26, both of which are adapted to revolve freely around the stud; and, to sleeve 26 is attached, by means of screws 27, the interior end 28 of the initial convolution of a flat wound spiral spring 29. In a similar manner, by bolts 30, the end 31 of the last or outer turn is held in rigid attachment with a cup-shaped guard 32, which guard is retained fixedly against bar 5 by a bracket 33, rivets 34, and screw 35; said guard is additionally supported against shake or vibration by a shoulder 36 on the end of stud 19 and a nut 37, said nut clamping the wall of the guard between itself and said shoulder. In this manner a self contained, rigid assembly of all the operative parts of my device is secured at a minimum of expense.

In the shell 1 of the drum, at a point adjacent to the head 3, are provided one or more keyhole shaped openings 38 for the reception of the end 41 of a rope 42 which is adapted to be wound around the drum. In operation, the end of the line is first entered into the round part 39 of the opening and then drawn into the rectangular projection 40 of the same, where it is pinched between the parallel walls thereof and retained in position.

In the legs 20 21 of the handle B, are circular apertures 43 44 for the ends 45 46 of a freely revolving roller 47', placed between said legs with its periphery in contact with the perimeters of the heads 3 4. Object of this roller is to prevent possible jamming of the rope 42 between the sides of the legs and heads.

To prevent the drum A from revolving, whenever it is desired to do so; there are provided in the head 4, one or more circular apertures 47, into which is adapted to enter a horizontal extension 48 of a preferably round wire rod 49, which extension is held from lateral motion by passing through an opening 50 in the leg 21. Externally of said leg, wire 49 extends upwardly and outwardly to an elevation but slightly below the connecting member 22, where it bends back upon itself and resolves itself into a modified S-shaped member 51, one leg of which passes through an aperture 52 in leg 21; it then turns again and projects again upwardly, parallel and adjacent to the inner wall of aforesaid leg 21. When almost in contact with the underside of member 22, wire 49 is bent once more in a horizontal direction, extending inwardly and parallel with said member 22 for a short distance, when it is turned upwardly and through an aperture 54, terminating with a button or head 55, between which and said member is interposed a helical spring 56 to retain wire 49 and button 55 in an elevated position as seen in Fig. 2, in which position it will be seen that the drum is prevented from revolving by the extension 48 engaging the aperture 47 in head 4. It will now be observed that by depressing button 55, (hole 52 and S-shaped member 51 acting as a pivotal point) extension 48 will be withdrawn from opening 47 in the drum head, thereby permitting the drum to be revolved. Releasing button 55 will, by the action of the spring 56, force extension 48 against the side of head 4, and when one of said openings 47 becomes in register with the extension, the latter will enter therein, and arrest further revolution of the same.

Operation of my device may now be briefly explained as follows:—Assuming the flat spiral spring 29 in the drum to be in an extended or unwound condition and no line on the drum, handle B is grasped in the right hand with the thumb depressing button 55 and the drum revolved with the left hand until further revolution is impossible, which indicates that spring 29 has been entirely wound up. Extension 48 is then permitted to engage one of the openings 47, and the rope 42 is entered into the keyhole shaped aperture in the shell as described before. Handle B is now grasped and button 55 again depressed, when drum A, now impelled by tensioned spring 29, through bevel gear 25, and pinion 10, will begin to revolve and wind up the line, the left hand in this case being employed to properly guide the rope. It should be understood that this winding process extends or relaxes spring 29, but when it is desired to withdraw part of the line from the drum, the said spring is automatically rewound in an obvious manner.

I now wish it understood that I may change or vary some of the minor details of my device without departing from the spirit or scope of my invention.

Having thus fully described my invention, I claim as new and desire to secure unto myself by Letters Patent of the United States:—

1. In clothesline reels, a handle member with two dependent legs and an axial supporting bar fixed between the free ends of said legs, a rigid stud extending at right angles from said bar, a gear wheel revolving freely thereon, a flat spiral spring fastened at one end to said gear wheel, with its other extremity connected to said bar, a drum loosely mounted on said bar, heads in said drum, and a pinion fixed to one of said heads, said pinion meshing with said gear wheel.

2. In clothesline reels, a handle member with two depending legs and an axial supporting bar fixed in the free ends of said legs, a rigid stud extending from said bar, a gear wheel having an integral sleeve revolving freely thereon, a flat spiral spring fastened at one end to said sleeve, with its other extremity connected to said bar, a drum loosely mounted on said bar, a pinion axially connected with said drum, said pinion meshing with said gear wheel.

3. In clothesline reels, a handle member with two dependent legs and an axial supporting bar fixed between the free ends of said legs, a rigid stud extending at right angles from said bar, a gear wheel revolving freely thereon, a flat spiral spring fastened at one end to said gear wheel, with its other extremity connected to said bar, a drum loosely mounted on said bar, heads in said drum, a pinion meshing with said gear and fixed to one of said heads, and means located in said handle member and one of said legs whereby the revolution of said drum may be arrested.

4. In clothes line reels, a handle member with two depending legs and an axial supporting bar fixed in the free ends of the same, a rigid stud extending from said bar and a gear wheel loosely mounted thereon, a flat spiral spring having one end attached to said gear and the other connected to said bar, a drum adapted to revolve on said bar, a pinion adapted to mesh with said gear wheel, and axially connected to said drum, and means located in said handle member and one of said legs whereby the revolution of said drum may be arrested.

In testimony whereof I have hereunto set my hand in the presence of two subscribing witnesses.

ROBERT ULBRECHT.

Witnesses:
WILLIAM O. STARK,
W. HARDING.